March 25, 1924.  1,488,083
E. R. WOLF
SHOCK ABSORBING AND DISTRIBUTING MECHANISM FOR AUTOMOBILES
AND OTHER VEHICLES
Filed Jan. 16, 1922    6 Sheets-Sheet 2

Inventor
Edward R. Wolf,
By Mauro, Cameron, Lewis & Keckam,
Attorneys

Patented Mar. 25, 1924.

1,488,083

UNITED STATES PATENT OFFICE.

EDWARD R. WOLF, OF MIAMI, FLORIDA.

SHOCK ABSORBING AND DISTRIBUTING MECHANISM FOR AUTOMOBILES AND OTHER VEHICLES.

Application filed January 16, 1922. Serial No. 529,564.

*To all whom it may concern:*

Be it known that I, EDWARD R. WOLF, a resident of Miami, Florida, and citizen of the United States, have invented new and useful Improvements in Shock Absorbing and Distributing Mechanism for Automobiles and Other Vehicles, which invention is fully set forth in the following specification.

This invention relates to shock transmitting and absorbing apparatus for vehicles, and more particularly to an apparatus of this type wherein shocks incident to irregularities encountered by the wheels in the surface over which the vehicle is traveling are transmitted from one wheel to the other wheels and absorbed at the points of support for the body.

It has heretofore been proposed to provide shock transmitting and absorbing apparatus for vehicles wherein air is employed to transmit the shock from one wheel to another and springs are utilized for absorbing shocks transmitted thereto by the air. Devices of this type as heretofore suggested are defective for the reason that air, being highly compressible, does not constitute an efficient shock transmitting means, the action of compressed air being sluggish in transmitting shock to the shock absorbing means and thereby defeating the original purpose of such devices.

It has further been proposed to provide shock transmitting devices interposed between the vehicle running gear and the body which utilize oil as a shock transmitting agent, and a single separate shock absorbing device mounted on the body and cooperating with the shock transmitting system to absorb shocks transmitted thereby. Devices of this type as heretofore employed are defective for the reason that no resiliency is interposed between the body and the shock transmitting system itself whereby a satisfactory absorption of the shock is not obtained.

The primary object of this invention is to overcome the defects and disadvantages inherent in devices of the type above referred to by providing both shock transmitting and absorbing devices arranged between the vehicle running gear and the body, said devices utilizing a heavy liquid as a shock transmitting agent and resilient devices as a shock absorbing agent, and said devices being equal in number to the wheels of the vehicle and so connected therewith that shock incident to irregularities encountered by one or more wheels will be instantly transmitted by the devices connected therewith for absorption by the devices connected with the several wheels.

A further object of this invention is to provide shock transmitting and absorbing devices that are effective when irregularities are encountered in the travel of the vehicle wheels and so arranged with respect to the usual vehicle springs that the body may be supported by the aforesaid devices and the vehicle springs utilized to absorb the rebound of said devices.

A further object of the invention is to provide shock transmitting and absorbing apparatus which is so connected with the vehicle running gear and so arranged with respect to the body supported thereon that the maximum freedom of steering movement of the front wheels may be obtained, and also whereby the apparatus may be installed without alteration to the present construction of stock cars.

Further objects of the invention relate to the provision of shock transmitting and absorbing apparatus which is efficient and simple in construction, inexpensive to manufacture and install, and which greatly adds to the convenience and comfort of occupants of the vehicle.

The invention may be embodied in a variety of mechanical expressions, some of which are shown in the accompanying drawings, but it is to be expressly understood that the drawings are for purposes of illustration only and are not to be taken as restrictive to the scope of this invention, reference being had to the appended claims for that purpose.

In said drawings—

In the embodiment shown in Figs. 1 to 5, the running gear comprises the usual front and rear axles 5 and 6 respectively, front wheels 7, and rear wheels 8. The body 9 is connected with the axles by the front and rear vehicle springs 10 and 11 respectively.

Figure 1:
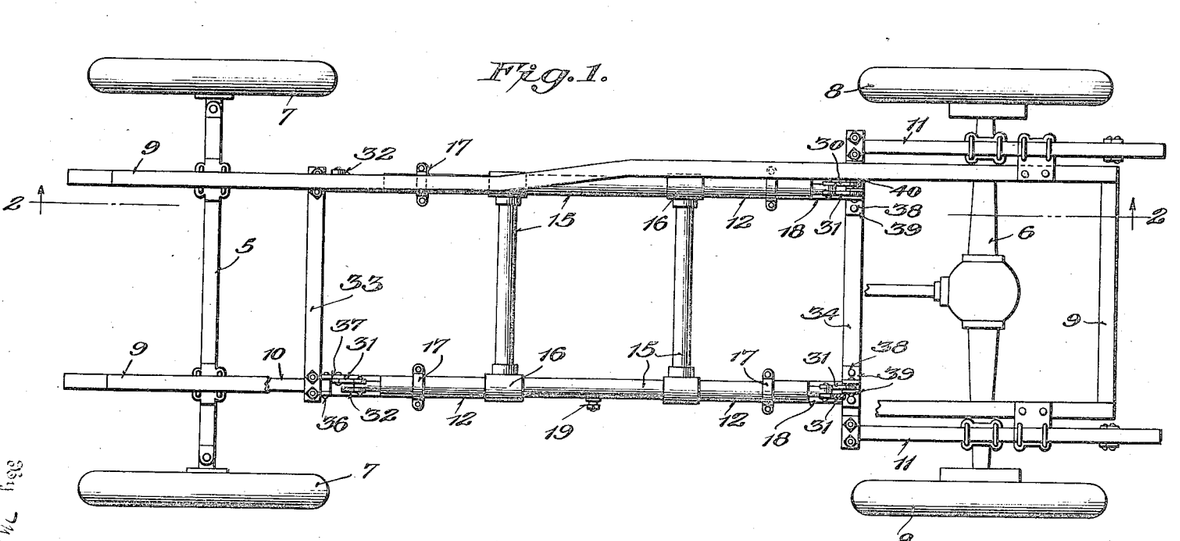
Fig. 1 is a plan view of a vehicle showing the invention applied thereto, parts being broken away for purposes of clearer illustration.
Figure 2:
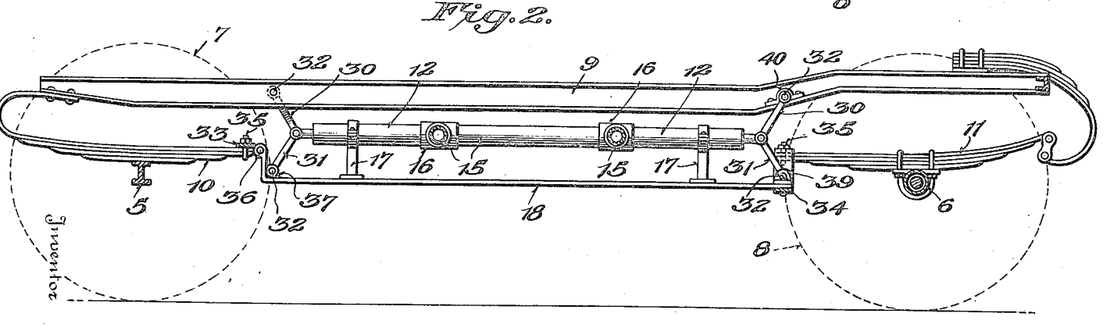
Fig. 2 is a longitudinal sectional view taken on the line 2—2 of Fig. 1.

The shock transmitting and absorbing devices comprise a plurality of cylinders 12, equal in number to the wheels of the vehicle, pistons 13 within said cylinders, and coil springs 14 through which pressure is transmitted between the pistons and the body 9 or the running gear or both. Intercommunication between the cylinders 12 is established by conduits 15 connected with each other and the inner ends of the cylinders by T-unions 16, whereby a substantially rectangular structure is obtained which is preferably disposed horizontally below the body 9, and supported by brackets 17, mounted on longitudinals 18 connected with the front and rear vehicle springs.

A liquid, for example oil, is introduced under pressure, within the cylinders and conduits through a filling valve 19, the liquid thus introduced confined between acting faces of the pistons. Since the shock transmitting and absorbing devices at each point of support for the body are identical in construction, a description of one will therefore be sufficient, and referring more particularly to Fig. 3, the acting face of piston 13 comprises a flanged plug 20 having threaded engagement with a suitable concentric opening in the inner end of the piston, and an annular packing ring 21 clamped between opposed faces of the piston and plug flange. The piston 13 is provided for a portion of its length with a rearwardly extending concentric recess 22 slidably receiving the inner ends of piston rod 23. A packing gland 24 surrounds the piston rod and is housed in a flared end of recess 22. The coil spring 14 is slidably received within the cylinder by the piston rod, the ends of said spring abutting respectively the outer end of the piston 13 and a washer 25 carried by the piston rod and held in position by a cotter pin 26 inserted in a suitable opening in said rod. The outer end of the piston rod is slidably received by a packing gland 27 housed in a concentric recess formed in an annular cylinder head 28 having screw threaded engagement with the wall of the cylinder at the outer end thereof.

Figure 3:
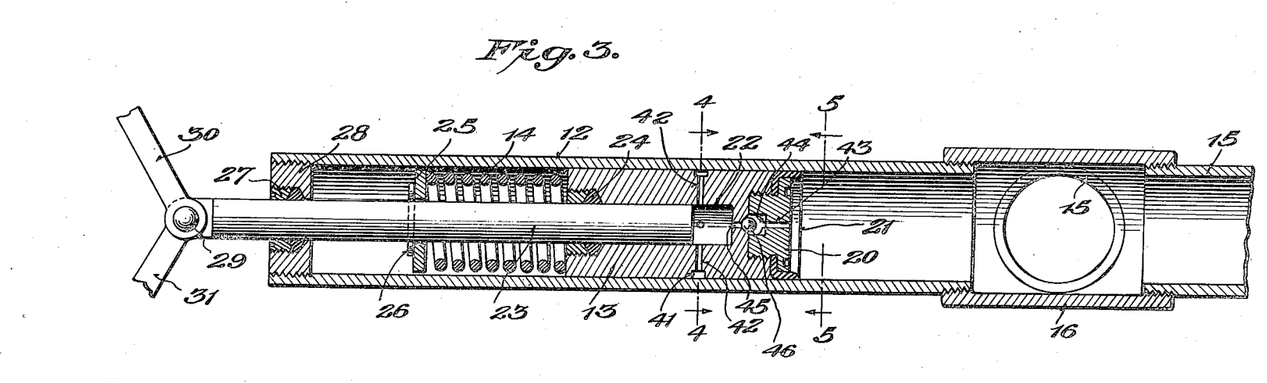
Fig. 3 is a fragmental sectional view through one of the shock transmitting and absorbing devices.
Figure 4:
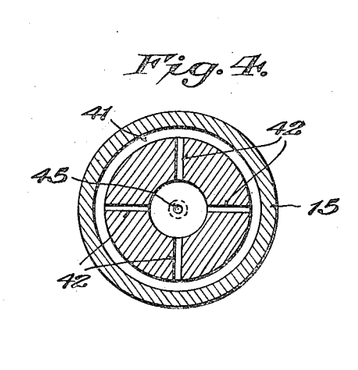
Fig. 4 is a section taken on the line 4—4 of Fig. 3.
Figure 5:
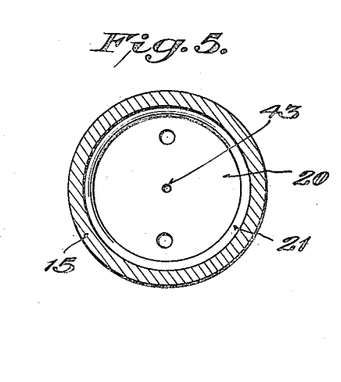
Fig. 5 is a section taken on the line 5—5 of Fig. 3.

The piston rod is connected by a bolt 29 with the inner ends of toggle levers 30 and 31 which are connected at their outer ends with the body and running gear respectively by bolts 32. Whereas I have shown the cylinders mounted on the running gear and the pistons connected with the body and running gear, it will be apparent to those skilled in the art that, without departing from the spirit of this invention, the pistons may be mounted on the running gear and the cylinders connected with the body and running gear.

The vehicle springs 10, 11 extend beyond the respective ends of the body and curve inwardly for attachment therewith by bolts or other suitable fastening means. The inner ends of the vehicle springs are connected with the toggle levers as clearly shown in Fig. 3 and in order to obtain maximum movement of said springs the axles are connected therewith at points substantially equidistant from the ends of the springs.

To provide for the maximum freedom of steering movement of the front wheels, and the installation of the apparatus without changes in the original construction of the vehicle, the shock transmitting and absorbing devices are supported, and connected with the body and running gear by the following means:

Transverse tie rods 33 and 34 are connected with the inner ends of the front and rear vehicle springs respectively by bolts 35, or other suitable fastening devices, the tie rod 34 being U-shaped in formation and depending below the rear springs so as to clear the transmission shaft. The longitudinals 18 are bent upwardly at their forward ends and connected with the inner ends of the front springs by bolts 36. Adjacent the bent up portions, said longitudinals are provided with brackets 37, and the bolts 32 of the front toggle levers are received by suitable apertures in the body sills and said brackets respectively. The rear ends of the longitudnals 18 are attached to the bowed portion of tie rod 34 by bolts 38. Brackets 39 are also connected with tie rod 34 by the bolts 38, and said brackets receive the bolts 32 of rear toggle levers 31, the bolts of the rear toggle levers 30 being received by brackets 40 suitably fastened to the body sills. By the above described connections the shock transmitting and absorbing means is supported below the body in parallel relation thereto and lateral movement of said means with respect to the running gear and body is prevented by the tie rods 33 and 34.

The vehicle springs which support the body may be utilized to cushion the rebound of the shock transmitting and absorbing devices, and the amount of liquid introduced within the cylinders and conduits may be such as to move the pistons outwardly, further compressing the coil springs 14, and spreading the toggle levers whereby a portion or all of the weight of the body is transferred from the vehicle springs to the liquid. The vehicle springs, relieved of part of the load, will therefore have greater freedom of action in cushioning the rebound of the shock transmitting and absorbing devices. Thus, the tension of the vehicle springs depends upon the weight of the body and the amount of liquid introduced, and may be increased or decreased as desired by increasing or decreasing the volume of liquid employed. On the other hand the entire weight of the body may be supported by the vehicle springs to effect maximum tension thereon, in which case the vehicle springs would coact with the coil springs in functioning as shock absorbing means.

The operation of the above described embodiment of the invention is as follows:

An irregularity in the surface over which the vehicle is traveling, encountered for example by the front right wheel will cause said wheel, as it rises to pass over the irregularity, to move the toggle levers associated therewith and they in turn will move the piston rod toward the inner end of the cylinder, the washer 25 thereof moving spring 14 which causes the piston 13 to move inwardly, thereby exerting increased pressure on the oil at this point. The oil, due to its incompressibility, is thereby caused to move and transmit the shock to the cylinders and pistons adjacent to the other wheels, thereby moving the other pistons toward the outer end of their cylinders, which movement further compresses the other coil springs and is absorbed thereby. The energy of the transmitted shock is thus absorbed by the increased tension of the coil springs 14. As a heavy liquid such as oil is substantially incompressible, the shock will be instantly transmitted and absorbed, such instantaneous transmission being further facilitated by the use of approximately equal diameter of bores in the cylinders and conduits respectively. Any shock incident to the movement of the pistons and coil springs in assuming their original position after the wheel has passed over the irregularity will be cushioned by the vehicle springs 10 and 11. It will be apparent that a reverse action takes place when the wheels encounter depressions in the surface over which the vehicle is traveling.

In order to prevent waste and leakage of the oil between the pistons and the cylinders, each piston may be provided at a point intermediate its ends with an annular groove 41 into which any oil leaking past the acting face of the piston will be received and transmitted, by radial openings 42 in the piston rod, to the interior of the recess 22, the oil being therein trapped between opposite ends of the piston rod and recess respectively. In this event plug 20 is provided centrally thereof with a vent 43 enlarged at the inner end to form a valve chamber, and provided with ribs 44. The piston body is also provided with a vent 45 terminating in a flare at one side to provide a valve seat. A ball valve 46 is positioned with the valve chamber and is normally seated to close the vent 45 by the pressure of the oil in the cylinders and conduits. On movement of the piston rod in the direction to transmit shock encountered by an obstruction, said rod will force the trapped oil through the vent 45 by unseating the ball valve, the ribs 44 preventing the ball from closing the vent 43 and the piston rod thereby acting as a plunger to force the oil back into the cylinder 12.

Figure 6:
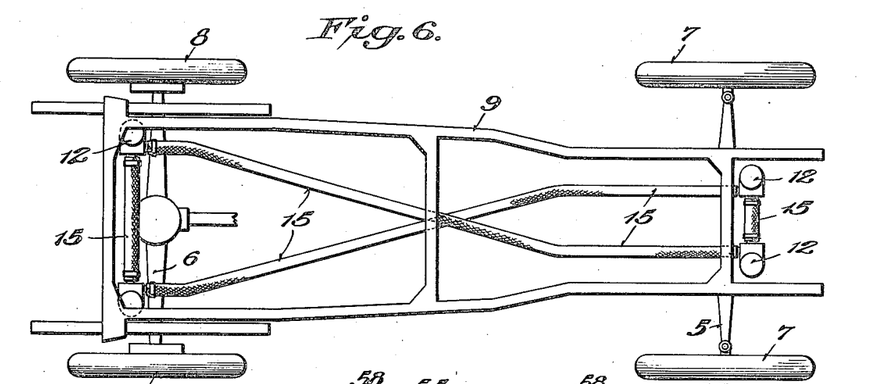
Fig. 6 is a plan view of a vehicle showing another embodiment of the invention applied thereto.
Figure 7:
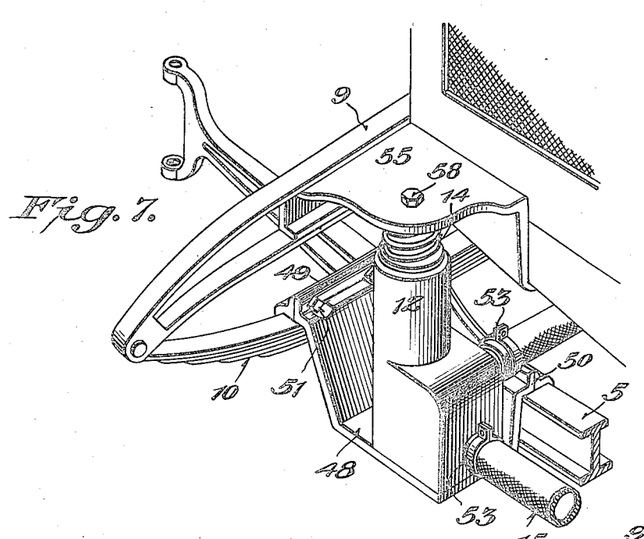
Fig. 7 is a perspective view showing one of the shock transmitting and absorbing devices attached to the front axle and the body adjacent to the front right wheel.
Figure 8:
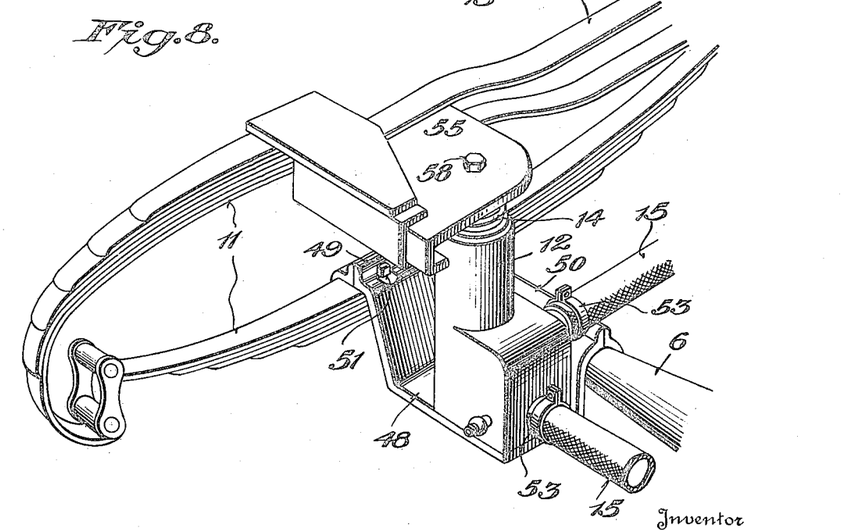
Fig. 8 is a view similar to Fig. 7 showing one of the shock transmitting and absorbing devices attached to the rear axle and the body adjacent to the left rear wheel.
Figure 9:
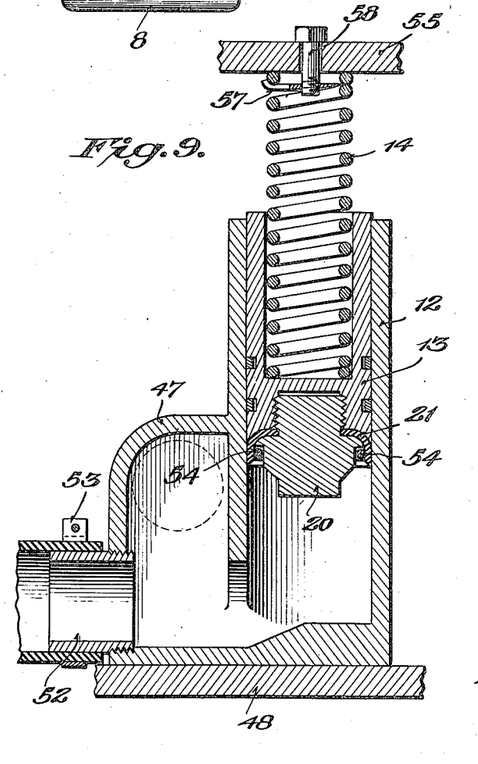
Fig. 9 is a vertical section taken through one of the shock transmitting and absorbing devices shown in Figs. 7 and 8.
Figure 10:
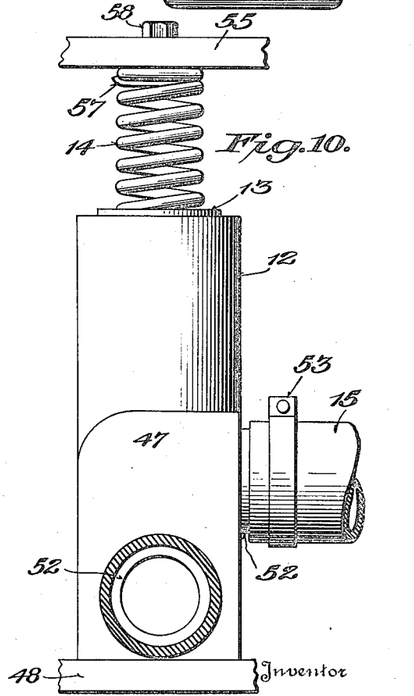
Fig. 10 is a side elevation of the shock transmitting and absorbing device shown in Figs. 7 to 9.
Figure 11:
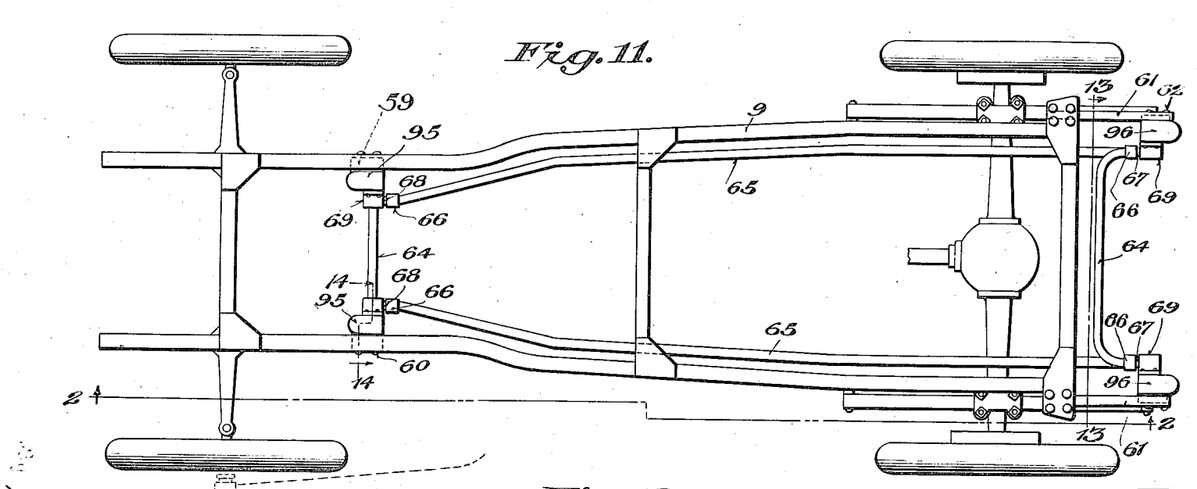
Fig. 11 is a plan view of a vehicle showing another embodiment of the invention applied thereto.

In the embodiment shown in Figs. 6 to 10 the number of shock transmitting and absorbing devices is the same as employed in the above described embodiment, and such parts of the devices which are identical with those above described are indicated by the same reference characters. Referring more particularly to Figs. 6 and 9, each cylinder 12 is offset at the bottom thereof to provide an enlarged chamber 47, and said cylinders are supported vertically by brackets 48 which depend from and are attached to the axles and springs of the vehicle. As shown in Figs. 7 and 8, each bracket is provided with flanges 49 and 50 preferably of split formation, which are clamped by bolts 51 or other suitable means to the springs and axles respectively. To facilitate accessibility and convenience in location of the cylinders for making repairs and filling the same with the shock transmitting liquid, the brackets supporting the cylinders for the front wheels are hung from the front of the axle, and the brackets for supporting the cylinders for the rear wheels are hung from the rear of the axle. The conduits 15 for establishing intercommunication between the cylinders may, in this embodiment of the invention, comprise sections of flexible hose, the arrangement of conduits being the same as in the above described embodiment except that the conduits are crossed longitudinally of the body so as to connect alternate right and left cylinders at the front and rear of the vehicle. The ends of the hose sections are received by nipples 52 having threaded engagement with suitable openings in adjacent walls of the enlarged cylinder chambers, the ends of the hose being secured to the nipples by clamps 53 or other suitable fastening means. In order to obtain substantially instant transmission of the shock by the oil, the combined cross sectional area of the two pipes for each cylinder is substantially equal to the cross sectional area of the cylinder.

The liquid is introduced within the cylinders and conduits through a filling valve on one of the cylinders, the oil being confined between the acting faces of the pistons 13. The piston 13 of each cylinder is provided with an expansible packing ring 54, interposed between the plug 30 and annular packing member 21, and the piston is counterbored for a portion of its length to provide a seat for one end of the resilient shock absorbing device or coil spring 14, the opposite end of said spring being secured to a plate 55 rigid with the body 9, the securing means for said spring comprising a clamp member 57 interposed between the coils of the spring and a bolt 58 passing through a suitable aperture in the plate 55 and having threaded engagement with the clamp member.

In the embodiment shown in Figs. 11 to 14, I employ four cylinders of like construction, two front cylinders 95, 95, disposed vertically under the engine hood and two rear cylinders 96, 96, located at the rear end of the vehicle body. The castings of these four cylinders are preferably rectangular in cross section and each cylinder is provided on the outer side thereof with a supporting bracket or lug 59, the front cylinders being attached to the channeled sills of the body 9 by bolts 60 which extend through suitable apertures in the sills and engage tapped openings in the lugs 59. The body is provided rearwardly with extension bars 61 bolted or otherwise suitably secured thereto and the rear cylinders are attached to said extension bars by bolts 62 which pass through suitable apertures in said bars and engage tapped openings in the lugs. Each casting is divided longitudinally thereof by a wall 63 which extends nearly to the top of the cylinder so as to provide, with the walls of the casting, the cylinder bore and an oil reservoir communicating with the cylinder at the upper end thereof.

Figure 12:
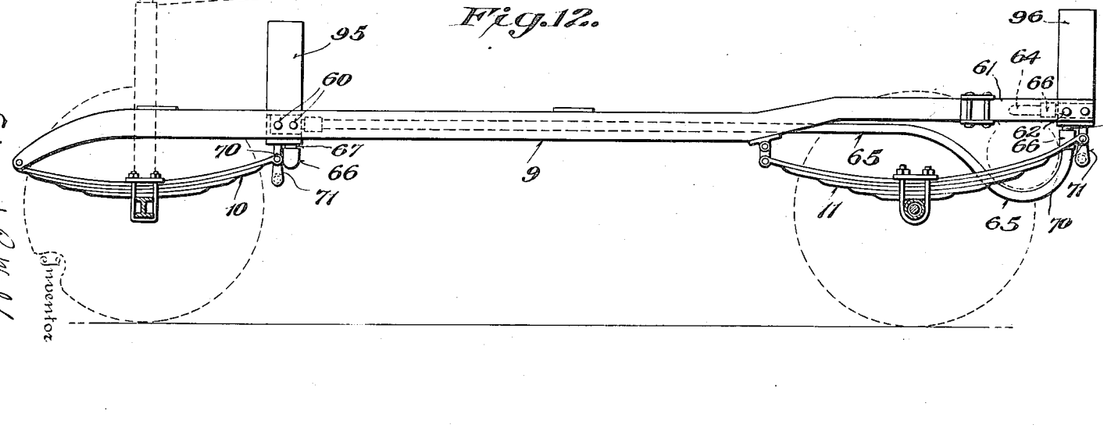
Fig. 12 is a side elevation of the vehicle shown in Fig. 11.
Figures 13, 14, 15:
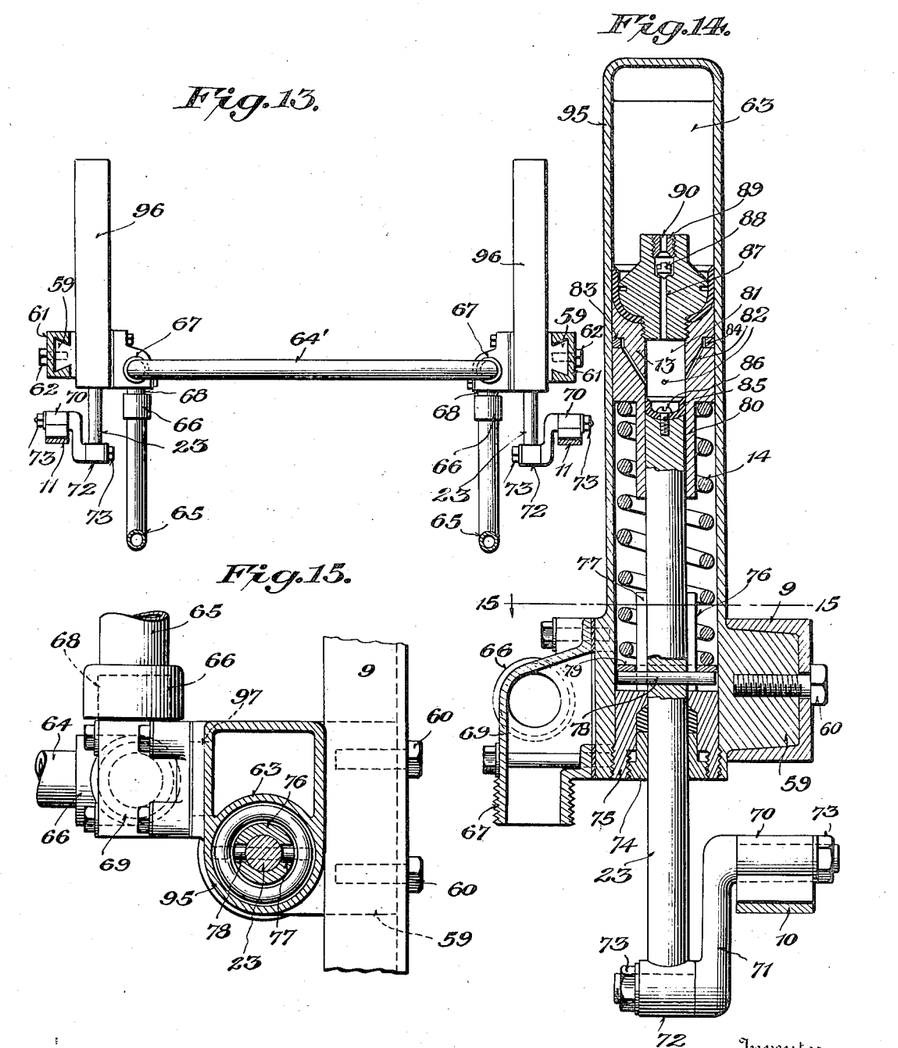
Fig. 13 is a transverse section on the line 13—13 of Fig. 11.
Fig. 14 is a vertical section on the line 14—14 of Fig. 11.
Fig. 15 is a fragmentary plan with parts in section taken on the line 15—15 of Fig. 14.

At the inner side of each cylinder the oil reservoir thereof is provided at its lower end with an aperture 97 (see dotted lines Fig. 15). Communication is established between the two forward cylinders by means of a seamless metal pipe 64, having unions 66, 66 at opposite ends thereof, said unions being respectively threaded onto tubular extensions 67, 67 of aperture blocks 69, 69, one of said blocks being secured to each cylinder over the aforesaid aperture 97. Communication between the two cylinders at the rear end of the vehicle is established through a similar pipe 64 and connections. Communication is established between the forward and rear cylinders at one side of the vehicle through a pipe 65 having at opposite ends thereof unions 66, 66 each engaging a tubular extension 68 on its corresponding aperture block 69. At the other side of the vehicle the forward and rear cylinders are connected by a similar pipe 65 and connections. As shown in Fig. 12, the pipes 64 and 65 at the rear of the vehicle may be bent to provide suitable space for the fuel tank (shown in dotted lines).

Referring more particularly to Figs. 12 and 14, the front ends of the vehicle springs 10, 11 are connected with the body 9 in the usual manner, and the rear ends of said springs are connected with the piston rods 23. Each vehicle spring is provided at the rear end thereof with a bearing 70 which receives one end of a crank 71, the opposite end of the crank being received in a bearing 72 at the lower end of the piston rod. The ends of the crank extend through and beyond said bearings and lateral displacement of the parts is prevented by nuts 73 having screw threaded engagement with the projecting ends of said crank. The piston rod 23 is slidably received by a packing gland 74 threaded into a suitable aperture on the lower end of a cylinder head 75 having threaded engagement with the inner wall of the cylinder bore. The cylinder head i. provided with a tubular extension 76 having diametrically disposed slots 77 which receive and guide a pin 78 extending transversely through a suitable aperture in the piston rod whereby the latter is guided in reciprocating movements thereof. The pin 78 forms an abutment for a washer 79 slidably received by the tubular extension 77, the washer and pin forming an abutment for one end of the resilient shock absorbing device or coil spring 14. The opposite end of the coil spring engages about a tubular extension 80 of the piston 13, the latter forming an abutment for the spring and the bore of extension 80 receiving the upper end of the piston rod 23. The bore of the extension 80 is continued longitudinally within the piston to provide a chamber 81 the walls of which are provided with radially disposed passages 82 communicating with an annular channel 83 formed in the outer wall of the piston. This channel 83 may be provided with a packing ring 84 and the piston rod is shown as provided at the end thereof with a cup shaped packing member 85 secured thereto by a set screw 86. The acting face of the piston comprises a flange or plug provided centrally thereof with a longitudinal passage 87 enlarged at the upper end to receive a valve 88 which is normally seated to close the passage 87 but adapted to open by pressure from beneath to permit oil to pass from chamber 81 into the upper end of the cylinder, it being understood that oil or other suitable liquid under pressure is introduced in the cylinders and conduits as heretofore explained with reference to the other embodiments of the invention. The valve chamber is closed by a plug 89 threaded into the end thereof and provided with a passage 90 whereby communication may be established between the interior of the cylinder and the chamber 81. The operation of the two embodiments of the invention last described is substantially the same as that set forth in connection with the first mentioned embodiment and hence further description thereof is believed to be unnecessary. Irregularities in the surface over which the vehicle is traveling will cause the running gear to impart relative movement to the cylinders and pistons which movement is instantly transmitted by the oil to and absorbed by the resilient shock absorbing devices, so that a substantially even distribution and absorption of shocks will be effected at the points of support for the body.

It will be apparent that changes may be made in the assembly and arrangement of parts of the apparatus without departing from the spirit of the invention, and such changes are contemplated within the scope of the appended claims.

What I claim is:

1. In combination, vehicle running gear and a body supported thereon, intercommunicating cylinders and conduits carried by one of said elements, means for transmitting shock encountered at one point of support of the body to the other points of support therefor, said means comprising pistons within the cylinders and a body of liquid confined in said cylinders and the conduits between the acting faces of said pistons, and resilient shock-absorbing means through which pressure is transmitted between each piston and one or more of said first-named elements and adapted to absorb shock transmitted in either direction.

2. In combination, vehicle running gear and a body supported thereon, intercommunicating cylinders and conduits carried by one of said elements, means for transmitting shock encountered at one point of support of the body to the other points of support therefor, said means comprising pistons in the cylinders and a body of liquid confined in said cylinders and the conduits between the acting faces of said pistons, resilient shock-absorbing means through which pressure is transmitted between each piston and one or more of said first-named elements and adapted to absorb shocks transmitted in either direction, and vehicle springs arranged between the running gear and said body for supporting the latter and cushioning the rebound of said shock-absorbing and transmitting means.

3. In combination with a vehicle having a spring-supported body, shock-transmitting means comprising a tubular structure provided adjacent its ends with cylinders, pistons within said cylinders, an incompressible fluid confined in said tubular structure between the acting faces of said pistons, piston rods slidably received within the pistons and provided with abutments, means connecting said piston rods with the upper and lower leaves of the spring support for said body, and resilient shock-absorbing means interposed between said abutments and pistons.

4. In combination, vehicle running gear and a body supported thereon, intercommunicating cylinders and conduits carried by one of said elements, shock-transmitting means comprising pistons within the cylinders and a body of liquid confined at all times within and filling the cylinders and conduits between the acting faces of said pistons, and resilient shock-absorbing means cooperating with the opposite face of each piston, said resilient shock absorbin means being positioned to transmit pressure from the respective pistons to said first-named elements.

5. In a shock-transmitting and absorbing device for vehicles, a conduit having cylinders at its opposite ends, pistons in said cylinders, an incompressible fluid confined in said conduit and cylinders between the acting faces of said pistons, piston rods for said pistons provided with abutments, said piston rods being connected with the vehicle and slidably received within said pistons, and resilient shock-absorbing means interposed between said abutments and pistons.

6. In combination, vehicle running gear and a body, shock-transmitting means carried by one of said elements and including intercommunicating cylinders and conduits and pistons in said cylinders, a liquid confined at all times with said conduits and cylinders between the acting faces of said pistons, and a toggle connection interposed between the rod of each piston and one or more of said first-named elements.

7. In combination, vehicle running gear and a body thereon, means whereby shock incident to obstructions encountered by travel of the wheels is transmitted and absorbed on relative movement between the running gear and body, said means comprising cylinders equal in number to the wheels of the vehicle running gear and carried by one of said first-named elements, conduits connecting said cylinders for establishing communication therebetween, pistons within the cylinders, a body of liquid confined at all times within the cylinders and conduits between the acting faces of said pistons, and a coil spring through which pressure is transmitted between each piston and one or more of said first-named elements.

8. In a shock-transmitting and absorbing device for vehicles, cylinders having intercommunicating conduits, pistons in said cylinders, an incompressible fluid filling said cylinders and conduits between the acting faces of said pistons, piston rods on which said pistons are slidably mounted, said rods being provided with abutments and connecting said pistons with the vehicle, and shock-absorbing means interposed between said abutments and pistons.

9. In combination, vehicle running gear and a body, vehicle springs interposed between and connecting the body with said running gear, a frame mounted on said springs and disposed below said body, shock-transmitting means carried on said frame, and shock-absorbing means through which pressure is transmitted between said shock-transmitting means and one or more of said first-named elements.

10. In combination, vehicle running gear and a body, vehicle springs interposed between and connecting the body with said running gear, shock-transmitting means comprising intercommunicating cylinders and conduits containing liquid and pistons in said cylinders acting on the liquid, a frame mounted on the lower leaves of the vehicle springs and on which said shock-transmitting means is supported, and resilient means through which pressure is transmitted between each piston and one or more of said first-named elements.

11. In a shock-transmitting and absorbing device for vehicles, a plurality of cylinders, a conduit connecting said cylinders for establishing communication therebetween, pistons in said cylinders, and incompressible fluid confined in said conduit and cylinders between the acting faces of said pistons, piston rods having toggle and sliding connections with the vehicle and pistons, said rods being provided with abutments, and resilient shock-absorbing means interposed between said abutments and pistons.

12. In combination, vehicle running gear and a body supported thereon, a plurality of liquid-interconnected shock-transmitting devices carried by one of said elements, and resilient shock-absorbing means through which pressure is transmitted in both directions between each of said shock-transmitting devices and one or more of said first-named elements.

13. In combination, vehicle running gear and a body, a plurality of liquid interconnected shock-transmitting devices carried by one of said elements, and a coil spring through which pressure is transmitted in each direction between each shock-transmitting device and one or more of said first-named elements.

14. In combination, vehicle running gear and a body supported thereon, intercommunicating cylinders and conduits carried by one of said elements, means for transmitting the shock encountered at one point of support of the body to the other points of support therefor, said means comprising pistons within the cylinders, an incompressible liquid confined within said cylinders and conduits between the acting faces of said pistons, and piston rods slidable within the pistons and operatively connected therewith and with one or more of said first-named elements.

15. In combination, vehicle running gear and a body supported thereon, intercommunicating cylinders and conduits carried by one of said first-named means, shock-transmitting mechanism comprising pistons within the cylinders and piston rods slidable within the pistons and connected with one or more of said first-named elements, and shock-absorbing means interposed between said piston rods and the pistons.

16. In combination, vehicle running gear and a body, a supporting frame disposed below said body, vehicle springs interposed between the running gear and the body and connected at their ends with the body and said supporting frame respectively, said springs being attached to the axles of the running gear at points intermediate the ends of the springs, shock-transmitting means mounted on said supporting frame, and resilient shock-absorbing means through which pressure is transmitted between the shock-transmitting means and one or more of said first-named elements.

17. In combination, vehicle running gear and a body, shock-transmitting means mounted on one of said elements, said means comprising intercommunicating horizontally disposed cylinders and conduits containing liquid and pistons within said cylinders acting on said liquid, and a spring through which pressure is transmitted between each piston and one or more of said first-named elements and adapted to absorb shocks received by said shock-transmitting means in either direction.

18. In combination, vehicle running gear and a body supported thereon, shock-transmitting means carried by one of said elements and comprising intercommunicating cylinders and conduits containing liquid, pistons disposed within said cylinders acting on the liquid to transmit and receive shock encountered in the travel of the running gear, toggle connections between the rods of said pistons and one or more of said first-named elements, and a resilient shock-absorber interposed between each piston and its respective rod.

19. In combination, vehicle running gear and a body supported thereon, means on one of said elements transmitting shock encountered at one point of support of said body to the other points of support therefor, said means comprising intercommunicating horizontally-disposed cylinders and conduits containing liquid and pistons within said cylinders acting on the liquid, means slidable with respect to the pistons for pivotally connecting the pistons with one or more of said first-named elements, and resilient shock-absorbing means interposed between said connecting means and pistons.

20. In combination, vehicle running gear and a body thereon, shock-transmitting means supported on one of said elements and comprising intercommunicating cylinders and conduits containing liquid and pistons within said cylinders adapted to act on said liquid, means relatively movable with respect to said pistons for connecting said pistons with one or more of said first-named elements, and resilient means interposed between each piston and its connecting means.

In testimony whereof I have signed this specification.

EDWARD R. WOLF.